(12) United States Patent
Malvar et al.

(10) Patent No.: US 7,069,590 B1
(45) Date of Patent: Jun. 27, 2006

(54) SYSTEM AND METHOD FOR PROTECTING DATA STREAMS IN HARDWARE COMPONENTS

(75) Inventors: Henrique Malvar, Redmond, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/507,478

(22) Filed: Feb. 17, 2000

(51) Int. Cl.
*H04L 9/00* (2006.01)

(52) U.S. Cl. ............................ 726/26; 726/28; 726/29; 726/30; 726/33; 380/201; 380/203; 380/217; 380/223; 380/287; 380/210; 705/57

(58) Field of Classification Search ................ 713/189, 713/193, 201; 380/283, 46, 201, 203, 217, 380/223, 287, 210; 705/57; 726/26, 28, 726/30, 29, 33
See application file for complete search history.

(56) References Cited

U.S. PATENT DOCUMENTS

| | | | | |
|---|---|---|---|---|
| 3,624,297 A | * | 11/1971 | Chapman | 380/274 |
| 3,723,878 A | * | 3/1973 | Miller | 380/39 |
| 4,188,580 A | | 2/1980 | Nicolai et al. | |
| 4,475,208 A | | 10/1984 | Ricketts | 375/1 |
| 5,991,416 A | * | 11/1999 | Bae | 380/39 |
| 6,047,069 A | * | 4/2000 | Hogan | 380/268 |
| 6,502,137 B1 | * | 12/2002 | Peterson et al. | 709/229 |
| 6,526,091 B1 | * | 2/2003 | Nystrom et al. | 375/142 |
| 6,526,145 B1 | * | 2/2003 | Marzahn | 380/42 |
| 6,598,164 B1 | * | 7/2003 | Shepard | 713/189 |

FOREIGN PATENT DOCUMENTS

JP     61003542     9/1986

OTHER PUBLICATIONS

Schneier, Bruce, Applied Cryptograpny, 1996, John Wiley & Sons, Inc., 2nd ed., pp. 176 and 226.*

(Continued)

*Primary Examiner*—Emmanuel L. Moise
*Assistant Examiner*—Paul Callahan
(74) *Attorney, Agent, or Firm*—Lee & Hayes, PLLC

(57) ABSTRACT

A scrambling architecture protects data streams in the operating system and hardware components of a computer by scrambling the otherwise raw data prior to the data being handled by the operating system. The architecture has a scrambler implemented at either the client or the server that adds noise to the content. More specifically, the scrambler produces periodic sets of tone patterns having varying amplitudes based on a first key. The scrambler also generates a random signal based on the first key and a second key. The tone patterns and random signal are added to the content to scramble the content. The scrambled content is then passed to the filter graph (or other processing system) where the content is processed while scrambled. Any attacker attempting to siphon off the bits during processing will steal only noisy data, which is worthless for redistribution or copying purposes. After processing, the scrambled data is passed to a driver for output. The driver implements a descrambler to unscramble the content by subtracting out the random noise signal. The descrambler detects the tone patterns in the content and recovers the first key from the varying amplitudes of the tone patterns. The descrambler also receives the second key via a separate channel (e.g., a cryptographically secured path) and generates the same random signal using the recovered first key and the second key. The descrambler subtracts the tone patterns and the random signal from the scrambled content to restore the content.

10 Claims, 8 Drawing Sheets

OTHER PUBLICATIONS

The Microsoft Press Computer Dictionary, 1997, Microsoft Press, 3rd ed., pp. 23 and 341.*

"Introduction to DirectShow", Microsoft DirectX, 'Online', Sep., 1999, pp. 1-3.

* cited by examiner

SYSTEM AND METHOD FOR PROTECTING DATA STREAMS IN HARDWARE COMPONENTS

TECHNICAL FIELD

This invention relates to systems and methods for protecting data content, such as audio and video data. More particularly, this invention relates to protecting data streams in hardware components.

BACKGROUND

More and more content is being delivered in digital form online over private and public networks, such as Intranets and the Internet. For a user, digital form allows more sophisticated content and online delivery improves timeliness and convenience. For a publisher, digital content also reduces delivery costs. Unfortunately, these worthwhile attributes are often outweighed in the minds of publishers by a corresponding disadvantage that online information delivery makes it relatively easy to obtain pristine digital content and to pirate the content at the expense and harm of the publisher.

Piracy of digital content, especially online digital content, is not yet a great problem. Most premium content that is available on the Web is of low value, and therefore casual and organized pirates do not yet see an attractive business stealing and reselling content. Increasingly, though, higher-value content is becoming available. Books and audio recordings are available now, and as bandwidths increase, video content will start to appear. With the increase in value of online digital content, the attractiveness of organized and casual theft increases.

The unusual property of content is that the publisher (or reseller) gives or sells the content to a client, but continues to restrict rights to use the content even after the content is under the sole physical control of the client. For instance, a publisher will typically retain copyright to a work so that the client cannot reproduce or publish the work without permission. A publisher could also adjust pricing according to whether the client is allowed to make a persistent copy, or is just allowed to view the content online as it is delivered. These scenarios reveal a peculiar arrangement. The user that possesses the digital bits often does not have full rights to their use; instead, the provider retains at least some of the rights. In a very real sense, the legitimate user of a computer can be an adversary of the data or content provider.

"Digital rights management" is therefore fast becoming a central requirement if online commerce is to continue its rapid growth. Content providers and the computer industry must quickly address technologies and protocols for ensuring that digital content is properly handled in accordance with the rights granted by the publisher. If measures are not taken, traditional content providers may be put out of business by widespread theft or, more likely, will refuse altogether to deliver content online.

Traditional security systems have not fully addressed this problem. There are highly secure schemes for encrypting data on networks, authenticating users, revoking certificates, and storing data securely. FIG. 1 shows a representative prior art system 20 having a content producer/provider 22 that produces original content (e.g., audio, video) and distributes the content over a network 24 to a client 26. The content producer/provider 22 has a content storage 30 to store digital data streams of original content and a distribution server 32 that transfers the content over the network 24 (e.g., Internet). The distribution server 32 includes an encoder 34 that encrypts and compresses the data prior to distribution over the network. In this manner, the data is protected in route over the public network 24.

The client 26 is equipped with a processor 40, a memory 42, and one or more media output devices 44 (e.g., monitor, display, sound card, speakers, etc.). The processor 40 runs various tools to process the data stream, such as tools to decompress the stream, decrypt the data, filter the content, and apply controls (tone, volume, etc.). An operating system 50 is stored in the memory 42 and executes on the processor 40. The operating system 50 implements a media player 52 that is capable of playing streaming media content, including both audio and video data. The media player 52 has a decoder 54 that provides the tools run by the processor 40 to decompress and decrypt the content.

Once the content is stored on the machine, there are products designed to restrict rights after purchase. For instance, a product from Liquid Audio (www.liquidaudio-.com) allows a content provider to restrict content to being played only on one machine. The product secures the source material by keeping an encrypted copy of the content on disk, and keeping a decryption key safely somewhere.

While this architecture safely protects the content from the provider 22 to the client 26 and even provides some protection while stored on the client, it does not address the assurance of content security after the content has been delivered to a client's operating system. Ultimately, useful content must be assembled within the client machine for display or audio output, and again, at this point the bits are subject to theft.

FIG. 2 shows client-side components to illustrate how raw data bits may be stolen despite protections in delivery and storage of the content. Encrypted and compressed data is received from the network at a communication port 60. The data is passed to the media player 52, which implements decryption/decompression tools 54 to decrypt and decompress the content stream. The media player 52 outputs a pulse code modulated (PCM) data stream, which is essentially the raw sequence of digitized samples without compression and encryption.

The media player 52 calls to an operating system API (application program interface) layer 62 to submit the PCM data to a mixer 64 (or other processing component). The mixer may be implemented, for example, using ACM (audio compression manager) or DirectX technology from Microsoft Corporation. The mixer 64 processes the PCM data with other sources to produce a desired output. At this point, the processed data is passed to a driver 66 (software and/or hardware) which outputs the data to the media output device(s) 44, such as a sound card and speaker, or a display.

With this traditional architecture, the data is left unprotected throughout the operating system software and hardware of the client device. Regardless of the upstream encryption and compression, the data is eventually passed to the lower level software and hardware components in a clear (unencrypted) form, which can be stolen. For instance, an attacker might introduce a fake driver 72 to receive the data from the mixer 64 and store the raw data on a storage medium 74 for illicit use that is not contemplated by the content provider (e.g., redistribution, multiple plays, etc.). Suppose, for example, that the media player is implemented using DirectX API layers. DirectX is an open standard that allows software applications to read sound and video data. A software package (e.g., "Total Recorder" software package) can install itself as if it were a sound card driver (i.e., fake driver 72) and all audio or video that flows into this virtual sound driver can be captured into a standard sound file (e.g. in ".wav" format).

Accordingly, there is a need for an architecture that protects bits after they have been given to the operating system. It is also desirable that the architecture integrate with an existing multimedia processing system called "DirectX" from Microsoft Corporation, which runs atop Windows brand operating systems. The DirectX architecture defines how to control and process streams of multimedia data using modular components called filters. Examples of filters include compressors, decompressors, renderers, mixers, parsers, splitters, and tuners for both audio and video data types. The filters have input or output pins, or both, and are connected to each other in a configuration called a filter graph. Applications use an object called the filter graph manager to assemble the filter graph and move data through it. The filter graph manager provides a set of Component Object Model (COM) interfaces so that applications can access the filter graph. Applications can directly call the filter graph manager interfaces to control the media stream or retrieve filter events, or they can use the media player control to play back media files. The reader is directed to the Microsoft web site Microsoft.com, and the file path for "directx" for more background information on DirectX, filter graphs, and individual filters.

One of the main attractions to the DirectX architecture is that it is modular and extensible. Unfortunately, these same advantageous attributes may be manipulated for improper use. For instance, a thief may insert a "T" into the filter graph to siphon compressed or uncompressed data to disk.

One possible approach is to secure the filter graph and the device drivers using only certified components. The drawback with this approach is that it introduces the burden of obtaining certificates for components and authenticating them during use.

Another approach is to keep the data encrypted until it reaches the driver layer 66. This approach has a drawback in that it may lead to poor quality output because some processing results from the filters do not transfer cleanly through the decryption algorithm when the encrypted data is subsequently decrypted, oftentimes rendering the data unrecoverable. Consider, for example, an encrypted MPEG stream. It will lose the MPEG transport layer framing and the filter graph will be unable to handle it. Another example is PCM audio. If the encrypted audio is mixed with another signal (e.g., a "ding" from a mail program), decryption is impossible. As a final example, a volume control that multiplies an encrypted audio bit stream by a constant renders an encrypted stream unrecoverable.

Thus, there is a need for an architecture that protects data while in the operating system and hardware components of the computer and integrates with the DirectX architecture, without deterioration of the signal quality when played.

SUMMARY

This invention concerns an architecture for protecting data streams in the operating system and hardware components of a computer.

In one implementation, a server serves encrypted and compressed content over a network to a client. The client receives the content and decrypts and decompresses it. At this point, the content is in the form of a pulse code modulated (PCM) data stream, which is essentially the raw sequence of digitized samples without compression and encryption. The PCM data stream is ready for processing (e.g., adjusting volume, mixing other sources, etc.). The client implements a set of tools to process the PCM data, such as filter graph technologies at the operating system level.

To prevent theft of the raw bits while they are being processed, the client scrambles the PCM data. One technique is to add noise by adding a random signal to the content. More particularly, the client has a scrambler to produce periodic sets of deterministic tone patterns. The scrambler modulates the amplitude of the tone patterns based on a first key, thereby embedding the first key into the modulated tone patterns. The scrambler also generates a random signal based on the first key and a second key. The tone patterns and random signal are added to the PCM data to scramble the content.

The scrambled content is passed to a filter graph or other processing system. The content is processed while in its scrambled state. Any attacker attempting to siphon off the bits while being processed in the filter graph will capture only noisy data, which is worthless for redistribution or copying purposes.

After processing, the scrambled data is passed to a driver for output. The driver implements a descrambler to unscramble the content by subtracting out the noise. The descrambler detects the tone patterns in the content and recovers the first key from the varying amplitudes of the tone patterns. The descrambler also receives the second key via a separate channel (e.g., a cryptographically secured path) and generates the same random signal based on the recovered first key and the second key. The descrambler subtracts the tone patterns and the random signal from the scrambled content to restore the PCM data to an unscrambled state, but with the modifications resulting from the processing.

In another implementation, the server scrambles the content prior to distribution over the network. The server-based scrambler cooperates with, or is integrated into, a compressing unit that compresses the content so that the compression algorithm does not render the scrambled content unrecoverable.

BRIEF DESCRIPTION OF THE DRAWINGS

The same numbers are used throughout the drawings to reference like elements and features.

DETAILED DESCRIPTION

Client-Based Architecture

Figure 1:
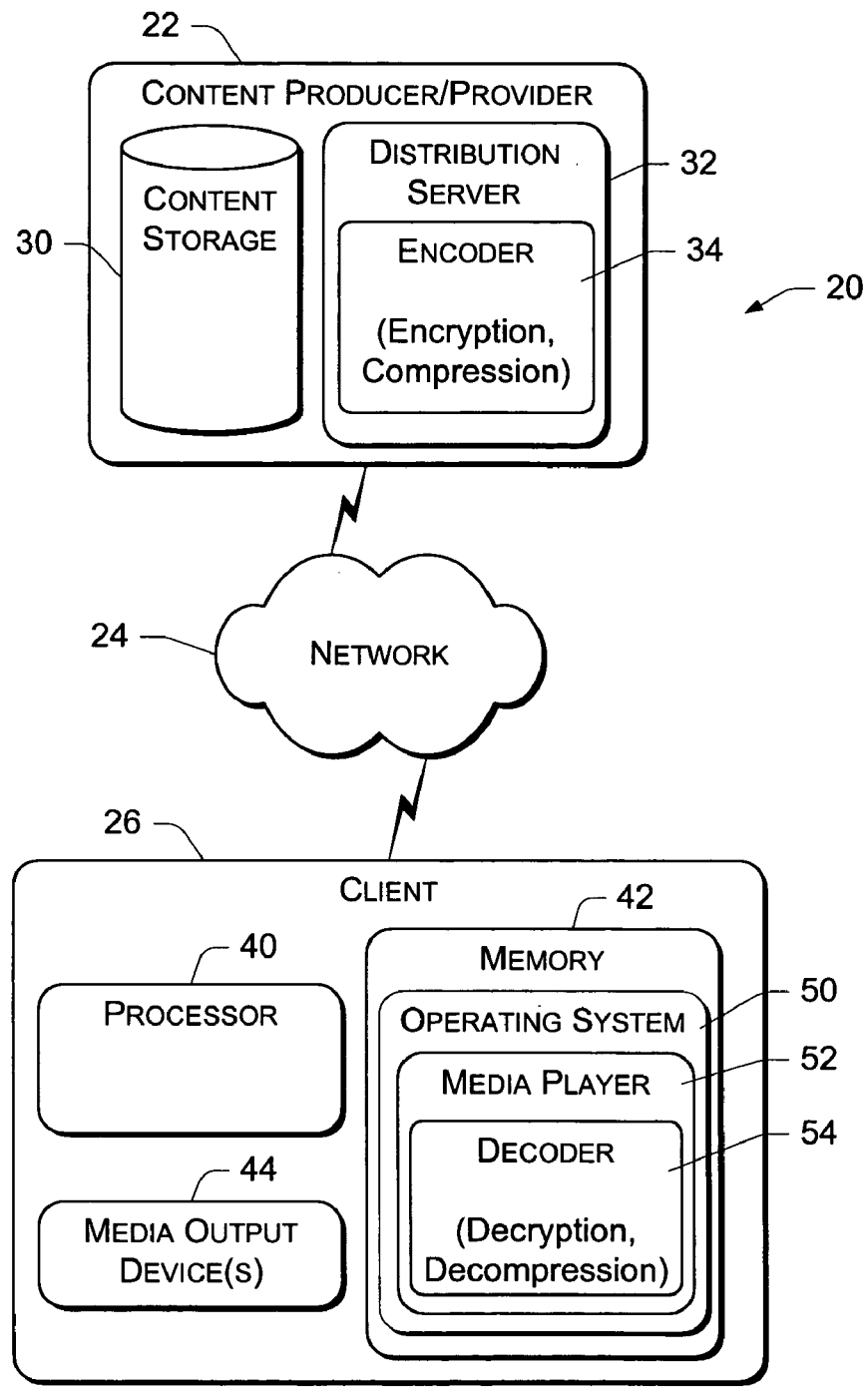
FIG. 1 is a block diagram of a prior art client-sever network system in which the server provides encrypted and compressed content over a network (e.g., Internet) to a client.
Figure 2:
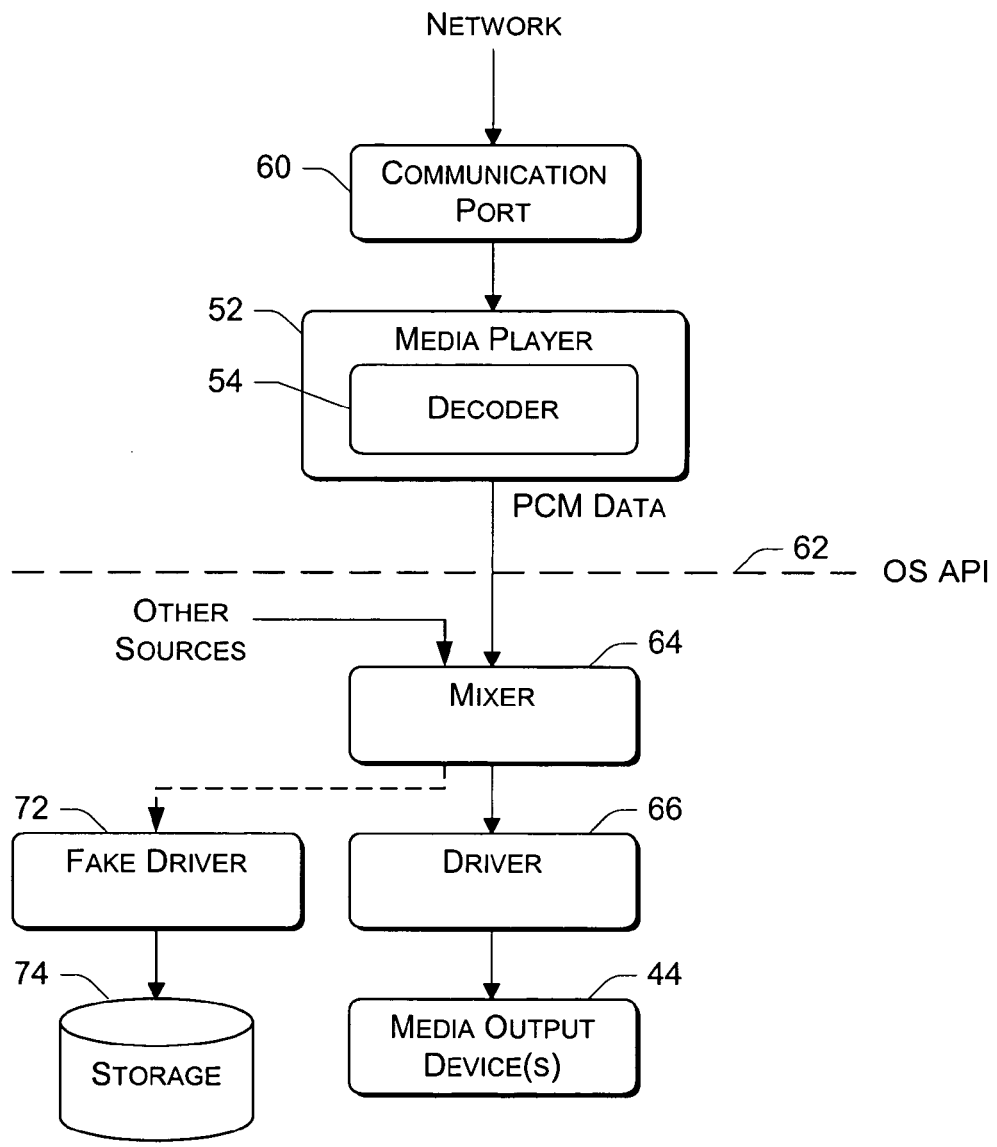
FIG. 2 is a block diagram of prior art hardware and software components implemented at the client to decrypt, decompress, and play the content.
Figure 3:
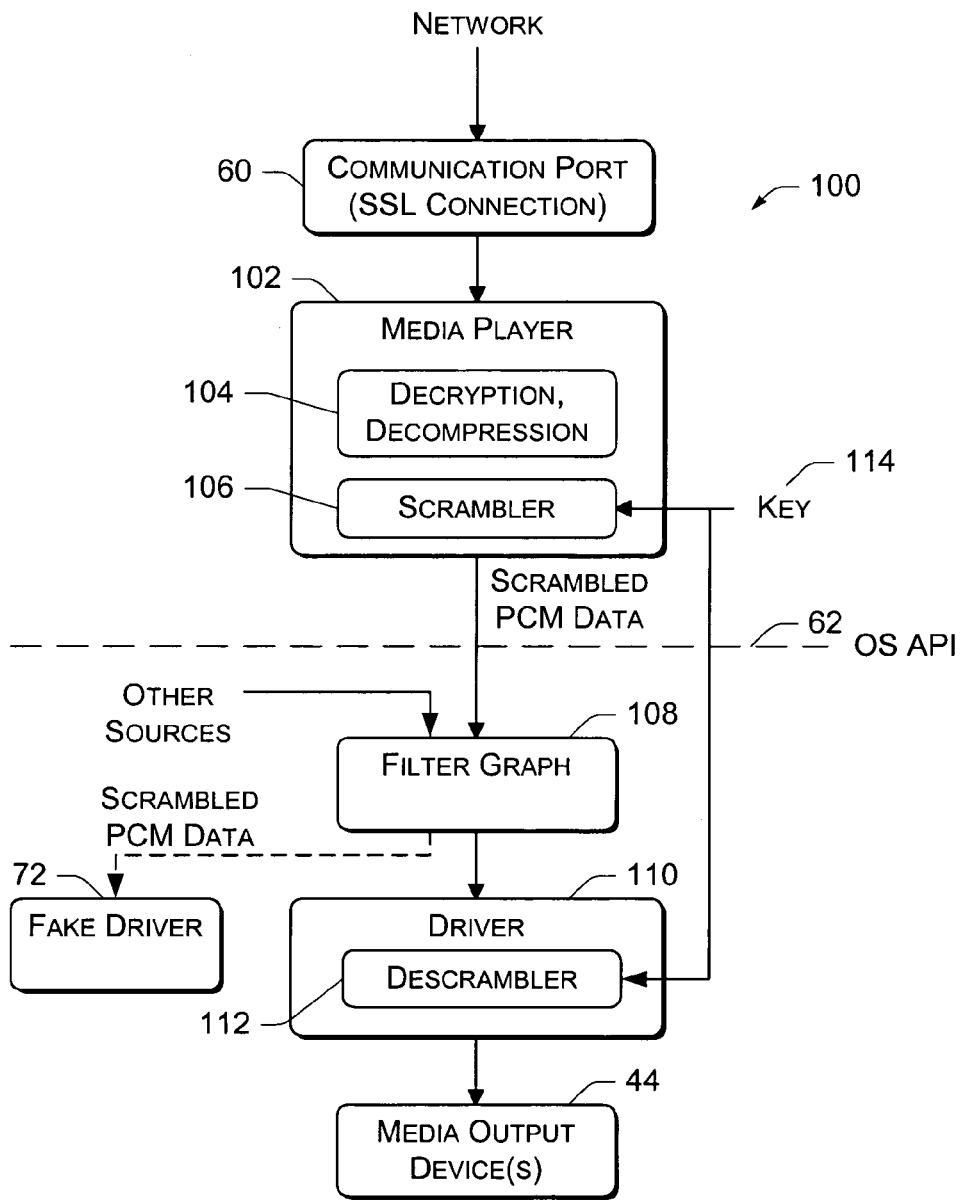
FIG. 3 is a block diagram of a client architecture that employs scrambling technology to protect data in the operating system and hardware components.

FIG. 3 shows a client-side architecture 100 that protects data streams (e.g., audio and video data) in the client computer. For discussion purposes, the client may be implemented as a general purpose computing unit (e.g., desktop PC, laptop, etc.) having a processor, volatile memory, non-volatile memory, and an operating system. It may also be implemented as other devices, such as cable modems, set-top boxes, audio/video appliances, and the like.

FIG. 3 shows a software/hardware architecture 100 implemented on the client computer. It is assumed that the client implements a tamper-resistant software application that connects to a content provider's server using an SSL (secure socket layer) or other secure and authenticated connection to purchase, store, and playback content. The tamper-resistant software stops attackers from easily modifying this component or extracting keys. However, at some point the audio must be handed to the operating system for playback.

The architecture 100 includes a communication layer or port 60 that receives encrypted and compressed data from a server over a network. The data is typically encrypted using well-know algorithms (e.g., RSA) and compressed using well-known compression techniques (e.g., AVI, MPEG, ASF, WMA, MP3). The data is passed to the media player 102, which is preferably implemented as the "Windows Media Player" from Microsoft Corporation. The "Windows Media Player" is implemented using DirectX API (application programming interface) layers, a group of technologies designed by Microsoft to make Windows-based computers a suitable platform for running and displaying applications rich in multimedia elements such as full-color graphics, video, 3-D animation, and surround sound.

The media player 102 implements decryption/decompression tools 104 to decrypt and decompress the content stream. At this stage, the content is in the form of a pulse code modulated (PCM) data stream, which is essentially the raw sequence of digitized samples without compression and encryption. To prevent theft of the raw bits as underlying filters process them, the media player 102 also implements a scrambler 106 to scramble the PCM data. The scrambler 106 modifies the data to such an extent that the bits, if stolen, would be essentially useless. For instance, scrambled audio may have a large amount of noise that sounds awful and cannot be removed, thereby negating any value in the stolen data. Yet, at the same time, the scrambled version of the audio or video looks sufficiently like real audio or video to the filters in the filter graph that normal, unmodified decoders or signal processing components work well. Thus, the scrambled content "looks like" unmodified content, but still guards against theft.

The scrambled PCM data is passed through an operating system API layer 62 to a filter graph 108, which processes the PCM data by adding one or more other signals, adjusting volume or tone, and so forth. The filter graph 108 processes the scrambled PCM data as if the data were the original, unscrambled PCM data. The filter graph 108 has one or more filters, such as a mixer, volume, tone, encoder, render, and the like that process the PCM data. It is noted that the filter graph 108 is shown for discussion purposes, but other types of signal processing technologies may be substituted for the filter graph.

The processed data is passed to a driver 110, which may be implemented in software and/or hardware. The driver 110 implements a descrambler 112 to unscramble the scrambled PCM data and restore the PCM data to its pre-scrambled condition, plus the modifications made as a result of the filter graph processing. The descrambler 112 outputs the unscrambled, modified PCM data to the media output device(s) 44.

The scrambler 106 and descrambler 112 utilize one or more secret keys 114 to generate the scrambling signal that is added to the PCM data. The keys 114 may be passed between the media player 102 and the driver 110 through an in-band channel accompanying the scrambled data, and/or via an out-of-band channel separate from the data path (e.g. the IOCTL device I/O control channel in DirectX). One implementation of the media player 102 and driver 110, and the keys utilized to scramble and unscramble PCM data, is described below in more detail with reference to FIG. 4.

The scrambling architecture protects the content while it is being processed by the operating system and lower level hardware components. An attacker hoping to siphon off raw bits from the filter graph 108 using a fake driver 72 instead receives scrambled data that is worthless from a recording or redistribution standpoint, thereby eliminating any financial incentive for the theft. Moreover, it is very difficult to unscramble the data without knowledge of the keys 114.

Scrambling Techniques

There are different ways to implement the scrambling architecture at the client to scramble the PCM data. One approach is to add noise to the signal. In the audio context, one noise-addition scheme is to generate a set of speech, music or noise-like functions using a session key and add those functions to the signal, either directly in the time domain or in a frequency or wavelet domain. The choice of function, its amplitude, phase, and dilation is selected on the basis of the key generator. Adding a few tens of noise bursts per second renders the signal worthless to an attacker, and the space that the attacker must "search" to remove the noise is quite large, even if the attacker knows the noise basis. However, given the key (and assuming no overloads) the noise signal can be subtracted exactly to return to the unscrambled state.

An alternative approach, used in prior art, is to employ time-domain and frequency-domain scrambling. In time-domain scrambling, the signal is broken into frames (e.g., 2 or 3 seconds), and each frame is broken into several segments. Within each frame, segments are permuted and reassembled. Typically, each frame uses a different permutation. A secret key controls the sequence of permutations. In frequency-domain scrambling, the signal is partitioned into overlapping frames (e.g., 50 ms), which are then mapped to the frequency domain via an FFT-based filter bank. The frequency bands are permuted and sent through a synthesis filter bank. Again, a secret key controls the sequence of permutations. Frequency-domain scrambling is harder to break than time-domain scrambling, but has the disadvantage of the additional computations for the analysis and synthesis filter banks.

The main disadvantage of time-domain and frequency-domain scrambling is that the scrambled signal cannot go through a mixer (e.g. a filter graph mixer such as 108 in FIG. 3), because after descrambling, the mixed signals would end up being scrambled. The scrambling based on noise addition, described below, overcomes this problem: signals mixed to the scrambled audio remain intact after descrambling.

Exemplary Noise-Addition-Based Scrambling

Figure 4:
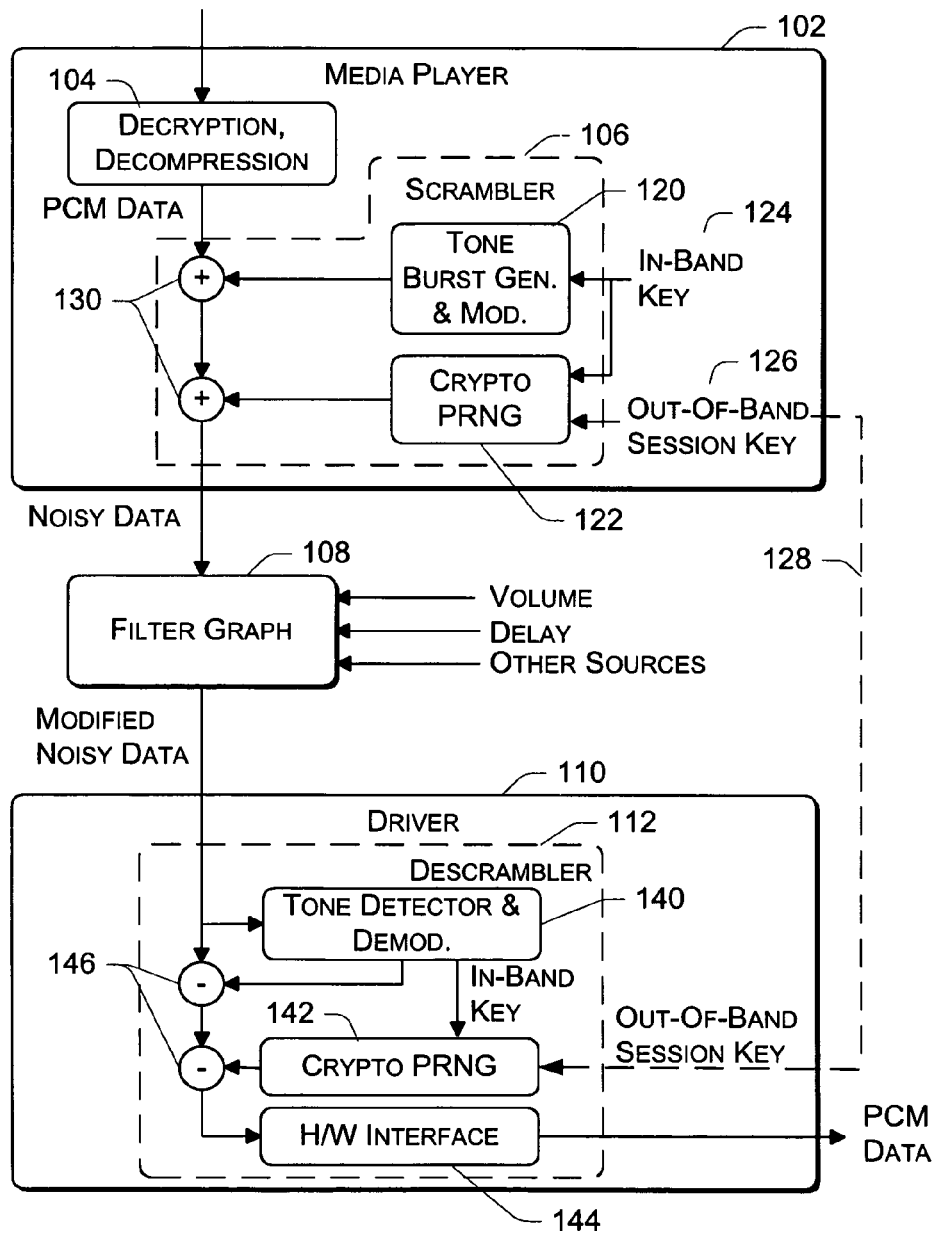
FIG. 4 is a block diagram showing one implementation of the scrambling technology of FIG. 3.

FIG. 4 shows client-side components that implement a noise-addition-based scrambling process to protect content while the content is being handled in the operating system and hardware components of the client computer. More particularly, FIG. 4 shows an exemplary implementation of the scrambler 100 at the media player 102 and the descrambler 112 at the driver 110. The scrambling process is described with additional reference to the flow diagram of FIG. 5. These steps are performed by the various software and/or hardware components shown in FIG. 4.

The process begins with the receipt of an encrypted and compressed data stream (e.g., audio, video) at the media player 102 (steps 200 and 202). The media player utilizes tools 104 to decrypt and decompress the stream, resulting in a PCM data stream (step 204). The scrambler 106 scrambles the PCM data by adding noise to the data (step 206). The scrambler 106 has a tone burst generator and modulator 120 to generate a synchronization tone and a cryptographic pseudo random number generator (PRNG) 122 to generate a random signal. Both the sync tone and the random signal are added to the PCM data to produce noisy or scrambled PCM data.

The tone burst generator 120 and PRNG 122 use two levels of keys to create the sync tone and random signal: (1) an "in-band" key 124, and (2) an "out-of-band" or "session" key 126. Both the tone burst generator 120 and the PRNG 122 use the in-band key 124, while only the PRNG 122 uses the out-of-band key 126. The keys may be implemented, for example, with large bit length, such as 56-bit or 128-bit keys.

Figure 5:
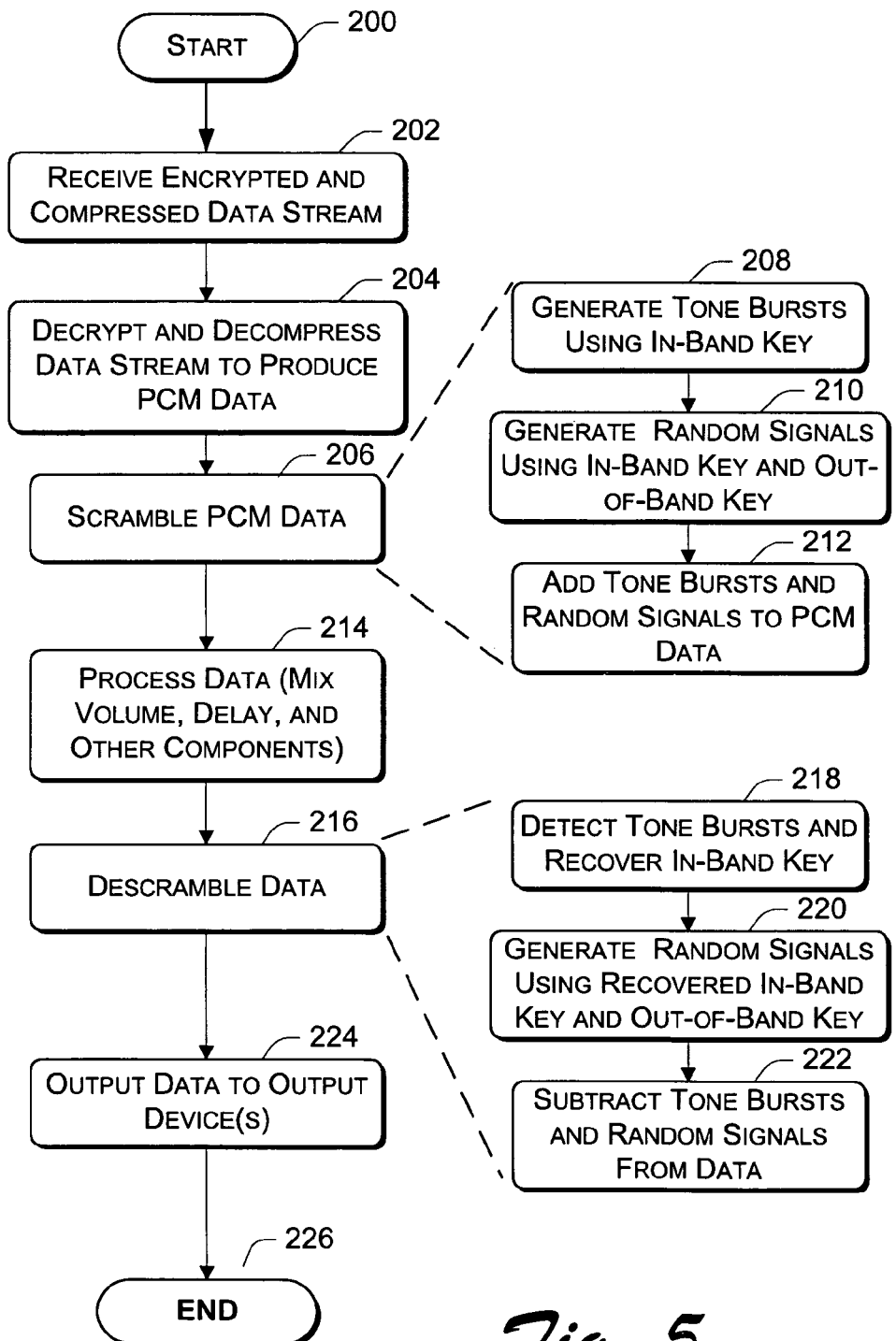
FIG. 5 is a flow diagram of a scrambling process implemented by the scrambling technology of FIGS. 3 and 4.

The tone burst generator and modulator 120 uses the in-band key to generate sets of tone bursts that can be easily recognized at the descrambler (step 208 in FIG. 5). The tone patterns are added periodically to the PCM data signal, such as every 100 ms.

Figure 6:
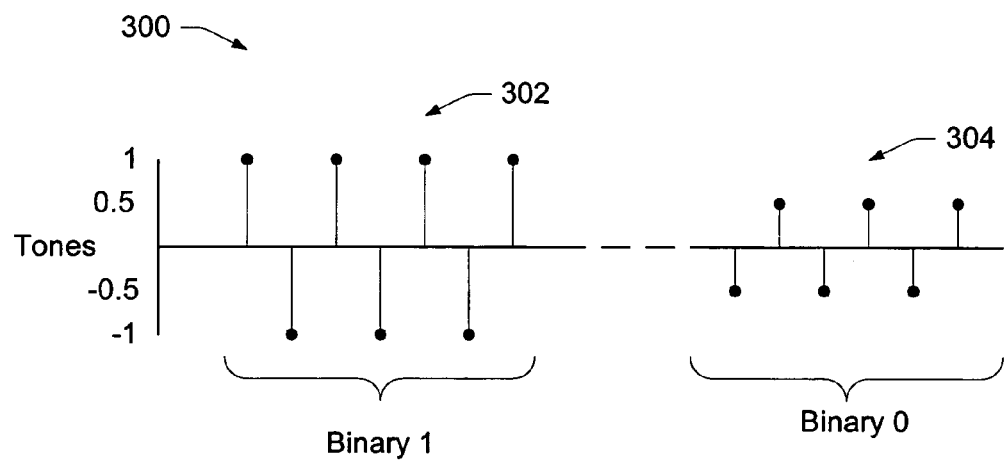
FIG. 6 is a time domain representation of a modulated tone signal added to the data as part of the scrambling process.

FIG. 6 shows an exemplary sync tone 300 having a deterministic pattern of bursts of alternating plus/minus values. The bursts may have one of two different amplitudes, such as +0.5/−0.5 or +1/−1. Modulating the amplitude of each burst pattern allows the scrambler to encode one bit or piece of information per burst sequence. For instance, one sequence of tone bursts 302 utilizes +1/−1 to represent a first binary value (e.g., 1) and a different sequence of tone bursts 304 utilizes +0.5/−0.5 to represent a second binary value (e.g., 0). The in-band key 124 is embedded into the sets of tone burst sequences as an aggregate of the bits in order to pass the key along with the data to the driver. The in-band key can be changed with each audio/video clip, with sets of clips, or even within clips.

The sync tone 300 has a frequency that is preferably one-half the sampling frequency of the original signal. For audio data with a sampling frequency of 44.1 kHz, the tone burst generator 120 generates a synchronization tone at 22.05 kHz. The tone can be easily detected at the descrambler and removed. Alternatively, even if the descrambler does not remove completely the sync tone, a digital-to-analog converter used in the driver or sound card will remove this tone frequency.

Figure 7:
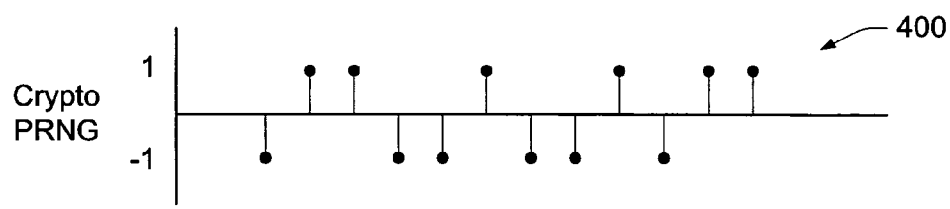
FIG. 7 is a time domain representation of random samples added to the data as part of the scrambling process.

With reference again to FIGS. 4 and 5, the cryptographic PRNG 122 generates a pseudo random signal using the in-band key and the out-of-band session key (step 210 in FIG. 5). FIG. 7 shows an exemplary random sequence 400 having a random pattern of data values with amplitudes of +1 or −1. The PRNG 122 is implemented to provide an equal chance of a +1 or −1 output, with the overall average being zero to avoid introducing a DC shift to the original data signal.

While the in-band key 124 is embedded into the tone sync signal, the session key 126 is kept independent of the data and passed over a separate channel 128 from the data path. The session key 126 is protected using a cryptographic key exchange (e.g., a Diffie-Hellman exchange and authentication) to ensure that the key 126 is safely transported from the media player 102 to the driver 110 over the channel 128 (which can be the IOCTL device control channel in DirectX, for example). Accordingly, the scrambler 106 or media player 102 is equipped with encryption and signing capabilities to encrypt and sign the session key for secure transportation to the driver 110 and descrambler 112.

The scrambler 106 adds the sync tone bursts and the random signal to the PCM data via adders 130 to scramble the data (step 212 in FIG. 5). If desired, the original signal (i.e., PCM data) and the random signal can be normalized to return the composite signal to a range anticipated by the filter graph 108. For instance, the PCM data may be multiplied by a factor 0.75 and the random signal may be multiplied by a factor 0.25 prior to adding the two signals to normalize the resulting composite signal.

The scrambled PCM data is passed to the filter graph 108 where it is processed and mixed with other sources (step 214 in FIG. 5). The filter graph may have one or more filters to process the data. As an example, the filter graph may adjust the volume of the signal or may impose an arbitrary delay as part of a processing step. The filters operate on the noisy data as if the data were the raw PCM data. The filter graph outputs the modified noisy data to the driver 110.

At step 216 in FIG. 5, the descrambler 112 at the driver 110 descrambles the modified noisy PCM data by removing the noise component from the data. The descrambler 112 has a tone detector and demodulator 140, a cryptographic PRNG 142, and a hardware interface 144. The tone detector and demodulator 140 detects the synchronization tone in the composite signal, measures any volume and delay introduced by the filter graph 108, and demodulates the tones to recover the in-band key 124 (step 218 in FIG. 5). The tone detector 140 passes the recovered in-band key 124 to the PRNG 142.

The descrambler 112 also receives the session key 126 from the out-of-band channel 128, decrypts and authenticates it, and gives the key 126 to the PRNG 142. The descrambler is equipped with decryption and verification means to decrypt and authenticate the session key as having been sent from the media player 102. The PRNG 142 implements the same algorithm as that used in the media driver's PRNG 122. Given the same in-band key 124 and session key 126, the PRNG 142 recreates the same random signal that was previously added to the PCM data at the media player (step 220 in FIG. 5).

The descrambler 112 subtracts the sync tone and random signal from the noisy PCM data via subtractors 146 to remove the noise (step 222 in FIG. 5). The PCM data is passed through the hardware interface 144 to the output devices (e.g., sound card, display) where the process ends (steps 224 and 226).

Figure 8:
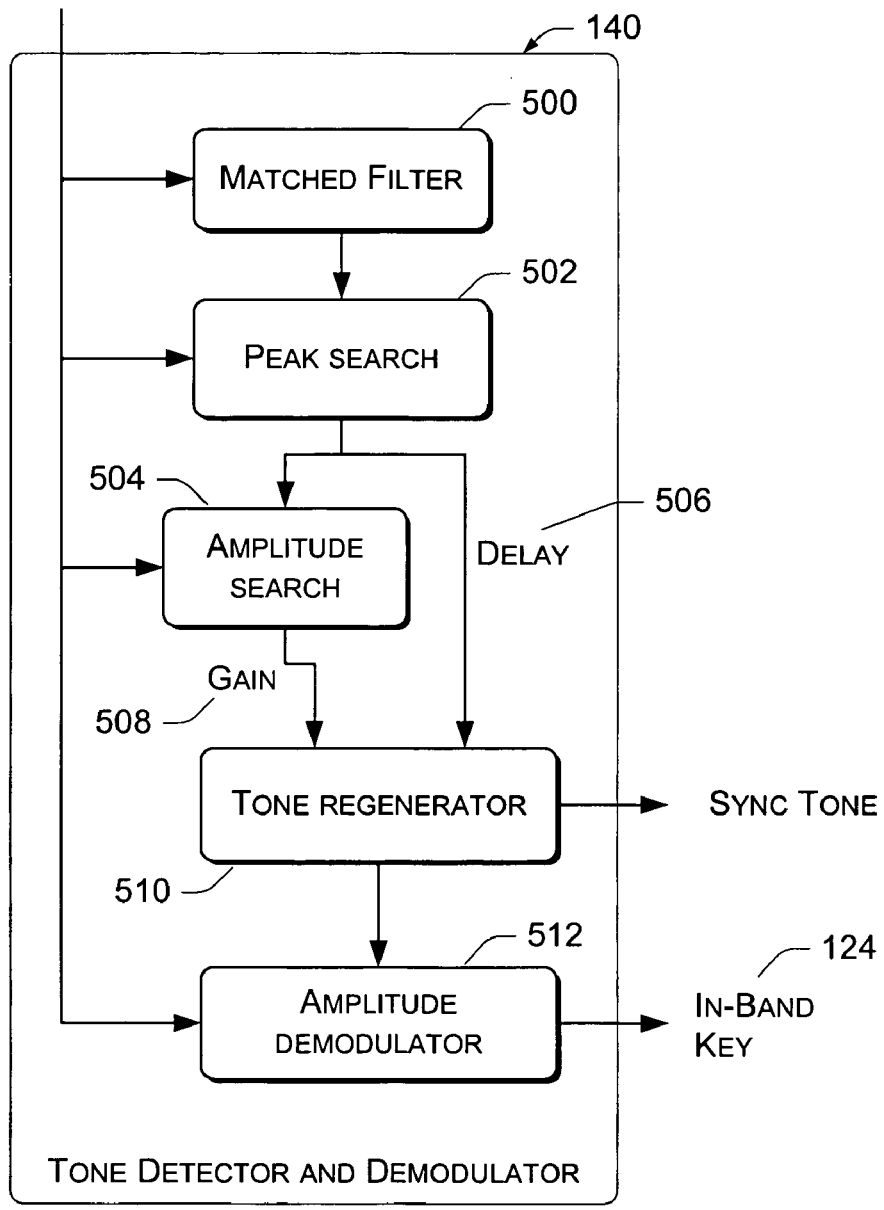
FIG. 8 is a block diagram of a tone detector and demodulator employed in the scrambling technology of FIG. 4.
Figure 9:
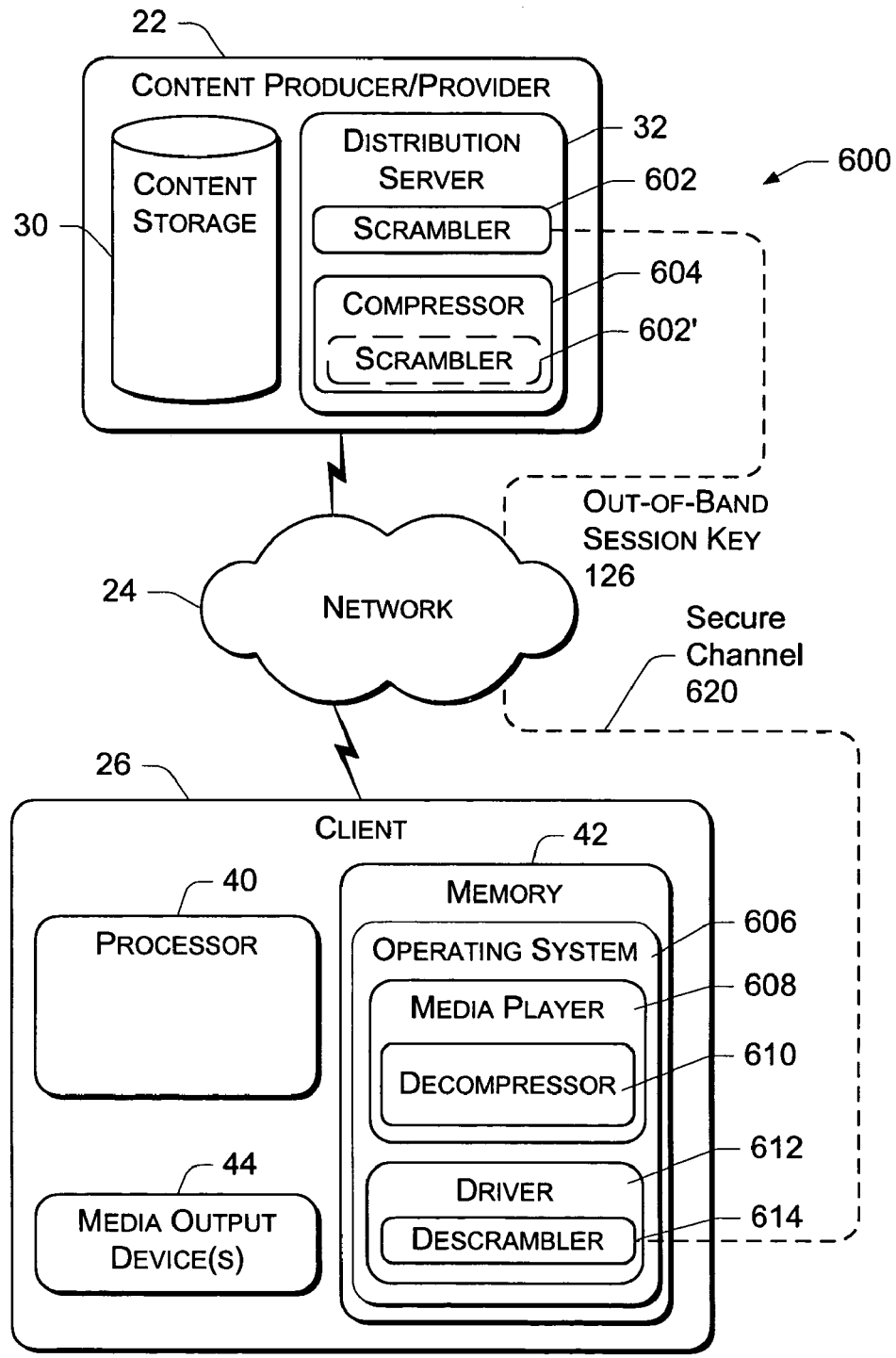
FIG. 9 is a block diagram of a client-sever network system implementing the scrambling technology on a network level, wherein scrambling occurs at the content provider and descrambling takes place at the client.

FIG. 8 shows one implementation of the tone detector and demodulator 140 implemented at the descrambler 112. The tone detector and demodulator has a matched filter 500 to detect the sync tone in the noisy PCM data. The matched filter 500 has as its impulse response h(n) a finite-length, time reversed copy of the pure sync tone. Therefore, the output y(n) of the matched filter is given by $$y(n) = \sum_{l=-L}^{L} h(l)x(n-l)$$

where x(n) is a modified noisy data signal, and 2L+1 is the length of the tone bursts. When the position of the tone pattern h(n) is aligned with the tone components in the signal, y(n) has a maximum. The position of the first maximum determines the delay 506 by which the tone and PRNG noise patterns should be moved in time in order to align properly with the modified noisy data.

The delay value and the noisy data are passed to a peak search module 502 that estimates any volume change imposed by the filter graph 108. The module estimates the appropriate gain 508 (by which the regenerated tone bursts and PRGN noise should be multiplied prior to the subtraction 146) through a search procedure, in which a gain estimate is iteratively refined until the signal energy after tone subtraction is minimized. The regenerated sync tone with the correct gain and delay is produced in module 510.

Detection of the in-band key is performed by amplitude demodulation module 512. For each tone burst, the module compares the burst amplitude with the average tone burst amplitude measure over a few past intervals. If the amplitude is above the average (say the amplitude is equal to 1.0 and the average is 0.75), then a bit of the key is demodulated as having one binary value (say "one"). If the amplitude is below that average (say the amplitude is equal to 0.5 and the average is 0.75), then a bit of the key is demodulated as having the other binary value (say "zero"). The process is repeated for subsequent tone burst until all bits of the in-band key 124 are recovered. The in-band key 124 can then be used by the cryptographic PRNG 142 to regenerate the random noise sequence to be subtracted from the scrambled signal.

In the above implementation, noise is introduced to the content by adding both a sync tone and a random signal. Alternatively, the content may be scrambled by XORing at least a portion of the content with a random bit stream generated by the PRNG 122. For instance, for 16 bit audio, the least significant 13 bits are XORed with bits generated by the PRNG 122. This effectively scrambles the content, with the additional property that one cannot "overflow" the integer representing the sound. To descramble the content, the lower bits are once again XORed with the same random bit stream.

CONCLUSION

The scrambling architecture is beneficial in that it protects the data content while in the operating system and hardware components of the computer. Another advantage is that the architecture integrates well with the existing DirectX technology. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A scrambling architecture for protecting content distributed by a content provider over a network to a client, comprising: a content scrambler to scramble the content using first and second keys to produce scrambled content, the scrambler embedding the first key into the scrambled content and passing the second key on a separate channel from the scrambled content; and a content descrambler to recover the first key from the scrambled content and to receive the second key, the descrambler unscrambling the scrambled content using the first and second keys to recover the content, and wherein the content scrambler is implemented at the client, so that the content is scrambled at the client after distribution over the network from the content provider.

2. A scrambling architecture as recited in claim 1, wherein the content scrambler and the content descrambler are implemented in software.

3. A scrambling architecture as recited in claim 1, wherein the content scrambler is implemented at the content provider, so that the content is scrambled prior to distribution over the network to the client.

4. A scrambling architecture as recited in claim 1, wherein the content descrambler is implemented within an operating system at the client.

5. A scrambling architecture as recited in claim 1, wherein the content descrambler is implemented within a driver at the client.

6. A scrambling architecture as recited in claim 1 wherein the content scrambler passes the second key to the content descrambler over a cryptographically secured path.

7. A scrambling architecture as recited in claim 1, wherein the content scrambler comprises:
   a tone generator and modulator to create periodic sets of tone patterns and to modulate amplitudes of the sets based on the first key;
   a random number generator to create a random signal based on the first and second keys; and
   an adder to add the sets of tone patterns and the random signal to the content to produce the scrambled content.

8. A scrambling architecture as recited in claim 7, wherein the tone generator and modulator modulates the amplitudes in a way that embeds the first key into the sets of tone patterns.

9. A scrambling architecture as recited in claim 7, wherein the tone generator and modulator produces the tone patterns with one of two amplitudes, wherein tone patterns with a first amplitude represent a first binary value and tone patterns with a second amplitude represent a second binary value, the first key being encoded into the sets of tone patterns as an aggregate of the first and second binary values.

10. A scrambling architecture as recited in claim 7, wherein the content descrambler comprises:
    a tone detector and demodulator to detect the periodic sets of tone patterns in the scrambled content and to demodulate the amplitudes of the sets to recover the first key;
    a random number generator to create a random signal based on the recovered first key and the second key; and
    a subtractor to subtract the tone patterns and the random signal from the scrambled content to recover the content.

* * * * *